April 18, 1944.　　　W. G. HARDING　　　2,347,101
METHOD OF MAKING CORRUGATED TUBES
Filed May 20, 1941　　　3 Sheets-Sheet 1

INVENTOR.
WATSON G. HARDING
BY Lester G. Budlong
ATTORNEY

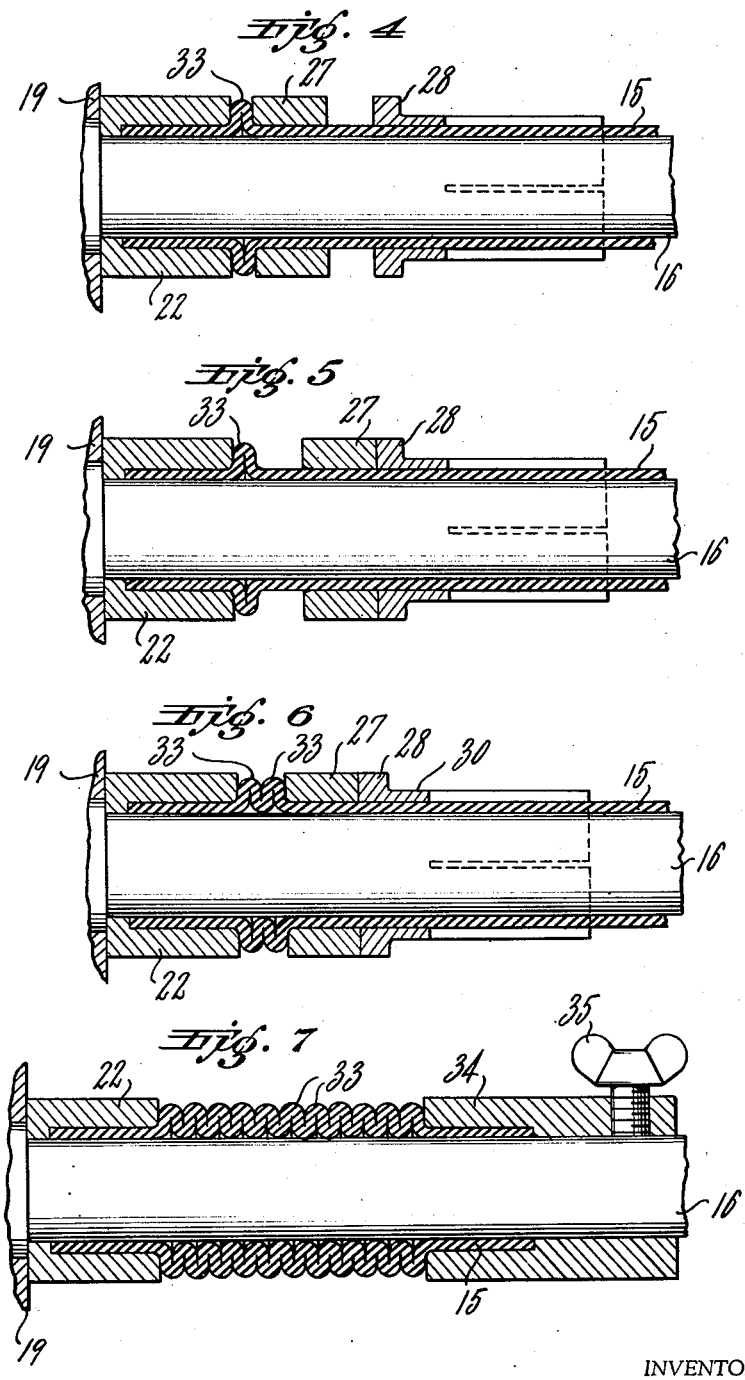

April 18, 1944.   W. G. HARDING   2,347,101
METHOD OF MAKING CORRUGATED TUBES
Filed May 20, 1941   3 Sheets-Sheet 3
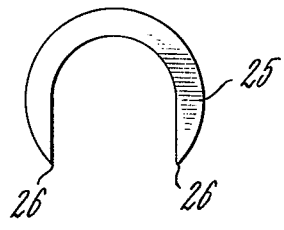
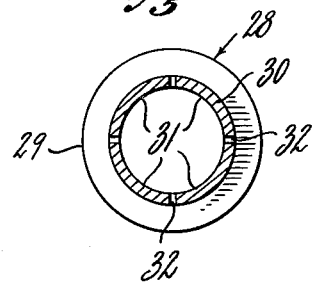
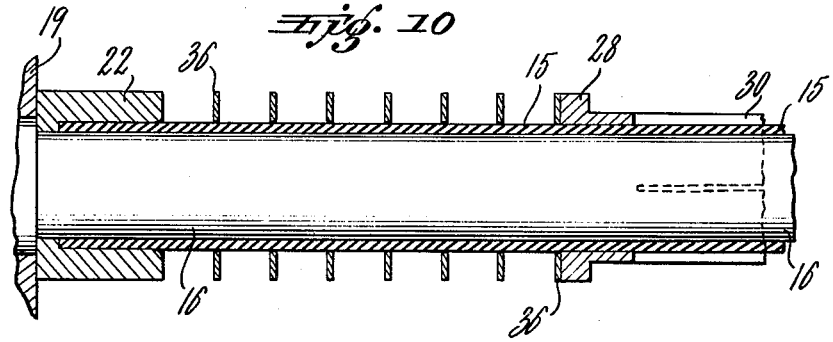
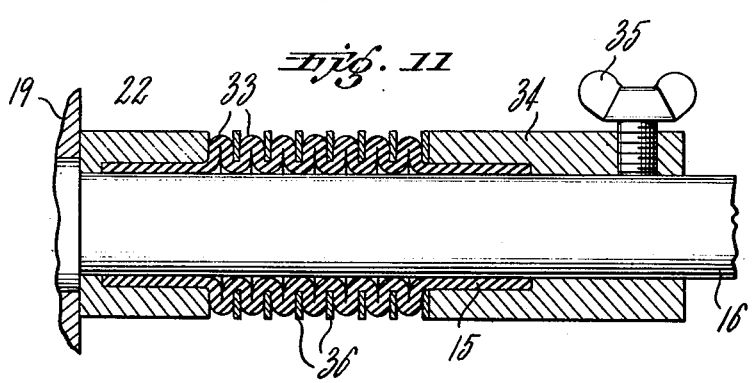
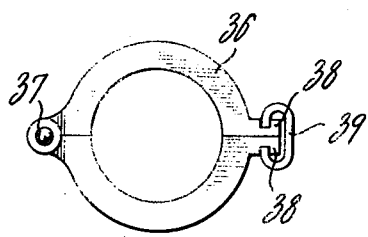
INVENTOR.
WATSON G. HARDING
BY
ATTORNEY Patented Apr. 18, 1944

2,347,101

UNITED STATES PATENT OFFICE 2,347,101

METHOD OF MAKING CORRUGATED TUBES

Watson G. Harding, Radburn, N. J., assignor to United States Rubber Company, New York, N. Y., a corporation of New Jersey Application May 20, 1941, Serial No. 394,278

5 Claims. (Cl. 18—56)

This invention relates to a method of making corrugated tubes, particularly to the method of corrugating tubes made of materials which may be expanded radially and flexed longitudinally by crowding together spaced circumferential portions which are restrained against radial expansion, and thereby causing the intermediate circumferential portions to expand radially. This process is particularly applicable to making corrugated tubes from vulcanizable rubber or rubber compositions used alone or in combination with reinforcing fabrics, such as stockinette or bias cut fabric so applied as to allow circumferential expansion at the desired places.

Heretofore rubber tubes have been corrugated by forming them in molds, and by forming the tubes on a longitudinally collapsible mandrel as described in applicant's application Serial No. 337,807 filed May 29, 1940, now Patent No. 2,272,704. In the molding process a considerable number of relatively expensive molds are required to produce the tubes in quantities and such process is relatively slow and expensive. In applicant's former process, it was necessary to replace the collapsible mandrels from time to time due to deterioration and wear during their use.

The present process overcomes the foregoing disadvantages by shaping the tubes to be corrugated on smooth mandrels which are relatively inexpensive as compared to molds and are more durable than the collapsible mandrels previously used. Furthermore, the present process is better adapted for making larger and longer corrugated tubes having the corrugations placed closer together.

In accordance with the present process the tube to be corrugated is slipped over a smooth mandrel. A portion of the tube is confined to prevent longitudinal movement on the mandrel and radial expansion and another portion of the tube is radially confined at a distance from the previously confined portion and the two confined portions are moved relatively towards each other so as to produce a corrugation therebetween. Successive corrugations are formed by radially confining the uncorrugated portions of the tube at a uniform distance from the previously formed corrugation and moving the confined portion toward the corrugation as previously mentioned. The corrugated tube is also formed by radially confining separated circumferential portions of the tube so that a desired number of confined portions will exist at one time. Corrugations are formed between the confined portions by crowding such portions closer together in an axial direction by applying forces directly to the outer confined portions.

After the required number of corrugations have been formed, the corrugations are held against axial expansion and the tube is treated to cause it to retain its corrugated shape. In the case of tubes made from vulcanizable rubber, or rubber compositions, the tube is vulcanized at this stage. After the tube has been treated to cause it to retain its shape, it is removed from the mandrel and it is ready for use. Such tubes have been found to be particularly useful for gas mask tubes, and before incorporating them in the gas mask, it may be necessary to trim the ends of the tubes in order to provide the ends with straight edges and to make the tube of the desired length.

The foregoing objects and advantages of the present invention will be more clearly understood by referring to the following description and the accompanying drawings, in which:

Fig. 1 is a longitudinal cross-sectional view of an apparatus which is adapted to perform the method embodying the present invention, and in which the tube to be corrugated is assembled on a smooth mandrel secured in a stationary fixture;

Figs. 2-6, inclusive, illustrate the successive steps utilized in forming the corrugations, the main portion of the fixture for the mandrel being broken away;

Fig. 7 is a cross-sectional view of the tube on the mandrel showing the tube after it has been corrugated and secured in position to be treated to set the corrugations;

Fig. 8 is a face view of a spacing member for determining the length of tube to be formed into each of the corrugations and the height of such corrugations;

Fig. 9 is a cross-sectional view on line 9—9 of Fig. 1 of a clamping member used to circumferentially confine portions of the tube and move such portions towards the opposed circumferential portions restrained against radial expansion to form the corrugations;

Fig. 10 is a longitudinal cross-sectional view of another form of an apparatus adapted to perform a modified form of the method shown in Figs. 1-7;

Fig. 11 is a cross-sectional view of a corrugated tube which has been formed in accordance with the modified method, and which is retained on the mandrel in its corrugated form ready to be treated to set the corrugations; and Fig. 12 is a face view of one of the split rings shown in Figs. 10 and 11 and which is utilized to circumferentially confine the portions of the tube between the corrugations.

Figure 1:
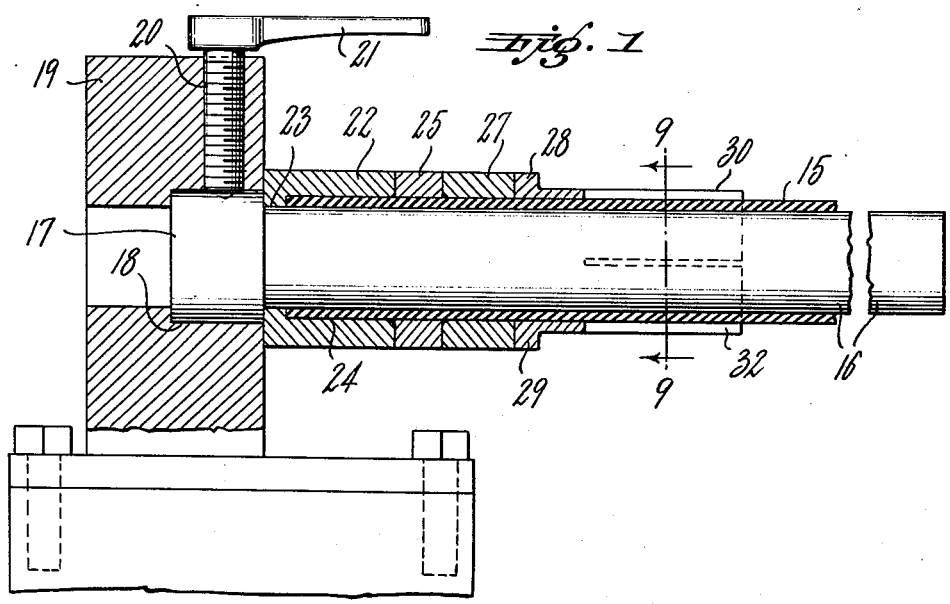

In carrying out the process as shown in the drawings, referring particularly to Fig. 1, the tube 15 to be corrugated is made of material which is capable of being expanded radially and flexed longitudinally. The invention will be described in reference to a tube made of rubber, or a vulcanizable rubber composition. In such case the rubber composition may be extruded in the form of a tube in long lengths, and then cut to the length required to form a corrugated tube of the desired length. The cut lengths of tube are thoroughly dusted with soapstone or other adhesion preventing material.

The tube is then in condition to be slipped over the smooth mandrel 16, which is provided with the head 17 secured in a socket 18 formed in a stationary fixture 19. The head 17 is held in place by a screw 20 which is manually operated by a handle 21. A ring 22 having a shoulder 23 adapted to fit the circumference of the mandrel 16 is slipped thereover and abutted against the head 17 of the mandrel. The ring 22 is provided with a recessed portion 24 adapted to receive the end of the tube 15, which is slipped over the mandrel. A spacing member 25, preferably of the shape shown in Fig. 8, is placed on the tube 15 and abutted against the end ring 22. The spacer 25 has a horseshoe shape and the distance between its ends 26 is at least as great as the outside diameter of the tube 15, so that it may be slipped on and off the tube without passing it over the end of the tube. A circumferentially confining and retaining ring 27 is then slipped over the free end of the tube and moved against the spacing member 25. Next a clamping member 28 is similarly placed over the tube 15 and moved against the ring 27. As shown in Figs. 1 and 9 the clamping member 28 is provided with a solid circumferential portion 29 and a relatively thin split sleeve 30. The sleeve is divided into four sectors 31 by the longitudinal slots 32. Such clamping member may be made of metal, and when the sleeve 30 is so divided it may be flexed radially inwardly by the grip of an operator's hand so as to clamp the tube 15.

Figure 2:
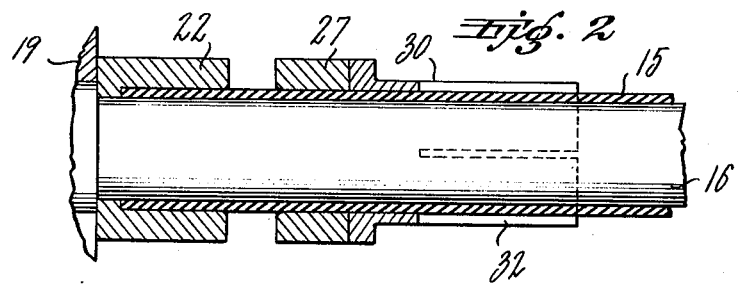
Figure 3:
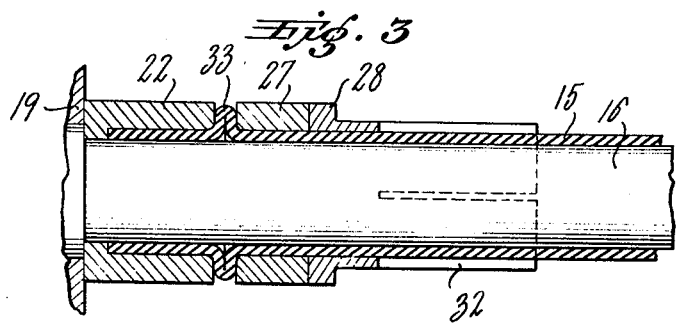

After assembling the tube 15 and apparatus as shown in Fig. 1, the spacing member 25 is removed from between the end ring 22 and the confining and retaining ring 27. Such position of the apparatus is shown in Fig. 2, and it is in position to produce the first corrugation. The operator then grips the sleeve 30 of the clamping member 28, and clamps the tube 15 between the sleeve 30 and the mandrel 16. The portion of the tube so clamped is moved towards the end confining ring 22, to the position shown in Fig. 3, and the first corrugation 33 is thereby formed. For the purposes of forming the next corrugation, the operator then holds the confining ring 27 against the corrugation 33 to hold it in place, and releases the clamping pressure on the sleeve 30 and moves the clamping member to the position shown in Fig. 4. The sleeve is again clamped against the tube 15 and the confining ring 27 is moved away from the corrugation 33 to the position shown in Fig. 5, that is, to a position sufficiently distant from the corrugation 33 to provide a space between it and the ring 27 to receive the spacing member 25, which will next be inserted in such space. The clamping member 28 is then moved against the confining ring 27 so as to cause it to abut against the spacing member 25 and to cause the spacing member to abut against the corrugation 33. By the use of the spacing member 25 the operator is assured that the same length of the tube 15 will be formed into each of the corrugations 33, and the height of each of the corrugations will be substantially the same. The spacing member is then removed so as to provide a space between the confining ring 27 and the corrugation 33 as shown in Fig. 5. In order to form the next corrugation the operator grips the sleeve 30 of the clamping member 28 and moves it and the confining ring 27 to the position shown in Fig. 6. Each of the successive corrugations 33 is formed in the manner of the last one until the desired number of corrugations are formed, as shown in Fig. 7.

In order to prevent the corrugations from spreading axially, the gripping member 28 is removed from the free end of the sleeve, and if desired, the confining ring 27 may also be removed while the corrugations are held in place, and a securing ring 34 is slipped over the free end of the tube 15 and the mandrel 16. The ring 34 is secured in position, as shown in Fig. 7, by a set screw 35 which is threaded through the periphery of the ring 34 and screwed against the mandrel 16.

After forming the corrugations and securing them against spreading as shown in Fig. 7, the tube is treated to cause the corrugations to retain their shape. In the cases where the tubes are made of vulcanizable rubber composition, such tubes are vulcanized in the usual manner. After they have been vulcanized the tubes are removed from the mandrel 16 and put to the desired use. In some cases the walls of the corrugations stick together during vulcanization and it is necessary to stretch them out slightly to break the adhesion.

If it is desired to produce corrugations whose adjacent walls are spaced from one another, this may be done by partially vulcanizing the tube when the corrugations are crowded together, as shown in Fig. 7, and then remove the retaining ring 34 and axially spread the corrugations the desired amount and reset the rubber by subsequent vulcanization.

A modified method of making corrugated tubes is shown in Figs. 10, 11 and 12. Referring to Fig. 10 the mandrel 16 with the end confining ring 22 assembled thereon is secured into the fixture 19 as described in reference to Fig. 1. The mandrel 16 is then surrounded by the tube 15 and split confining rings 36 of the construction shown in Fig. 12 are placed around the tube 15 in longitudinally spaced relation to one another. The distance between the rings 36 may be determined by a spacing member similar to the member 25 shown in Fig. 8. Each of the rings 36 are hinged at 37 and are provided with diametrically opposed projections 38 which are adapted to be clamped together by a spring clip 39. The rings are placed in position on the tube 15 by removing the clips 39, opening up the halves of the rings 36 and placing them over the tube 15. The rings are secured in place by replacing the clips 39. After the desired number of rings have been placed over the tube 15 the clamping member 28 is inserted over the free end of the mandrel 16 and tube 15. It is moved up against a confining ring 36 nearest the free end of the mandrel. The operator then grips the sleeve 30 and clamps the tube 15 between it and the mandrel 16, and while so clamping the tube 15 it is moved towards the end confining ring 22 until all of the confining rings 36 have been moved up to the position as shown in Fig. 11, so as to form the several corrugations 33. The clamping member 28 may then be removed from the free end of the mandrel 16 and replaced by the end retaining ring 34 which is clamped on to the mandrel 16 by the set screw 35 to hold the corrugations and prevent them from spreading. The tube thus corrugated may be treated to cause the corrugations to retain the shape shown in Fig. 11. After the tube 15 has been thus treated the split confining rings 36 may be removed. Where the tube is vulcanized or set with the rings 36 thereon, the adjacent walls of the corrugations will be slightly separated.

If it is desired to produce corrugations having adjacent walls in close contact as shown in Fig. 7, this may be done by removing the rings 36 before the corrugations have been permanently set. In such case the rings 36 would be removed after the corrugations have been formed as shown in Fig. 11, and before the corrugations are forced together by end clamping ring 34. After removal of the rings 36 the end clamping ring 34 would be pushed towards the end confining ring 22, so as to bring the adjacent walls of the corrugations together and then secured to the mandrel 16. The tube would be then vulcanized or otherwise set.

In both forms of the invention, the mandrel 16 is smooth in the sense that it is not provided with any ridges to prevent the tube from readily slipping over it. The mandrel is preferably provided with means for venting the air to and from the interior of the corrugations 33 to and from the outside atmosphere while the corrugations are being formed and the tube is being cured. For this purpose one or more longitudinal grooves (not shown) may be provided in the surface of the mandrel 16. Such grooves should not be deep enough to form substantial ridges in the tube. It has been found for some classes of tubes, grooves having a depth of .02" are satisfactory.

While the invention has been described more or less in detail, it will be understood that changes may be made without departing from the spirit of the invention, and it is desired to claim the invention as broadly as defined by the appended claims within the limitations imposed by the prior art.

Having thus described my invention, what I claim and desire to protect by Letters Patent is:

1. The method of making circumferentially corrugated tubes comprising the steps of surrounding a mandrel with a tube to be corrugated, circumferentially confining the tube at one end against outward radial expansion and longitudinal movement in the direction in which such end extends, confining the tube against radial outward expansion at a distance from said first mentioned confined portion and leaving the portion of the tube between the confined portions free to expand radially, moving the last confined portion towards the first confined portion so as to form a corrugation between the confined portions, forming successive corrugations by repeating the steps of holding the last formed corrugation against longitudinal movement in respect to the mandrel, holding the tube against longitudinal movement in respect to the mandrel at a distance from the corrugation, releasing the corrugation and circumferentially confining the tube against outward radial expansion at a distance from the corrugation, and moving the circumferentially confined portion towards the corrugation.

2. The method of making circumferentially corrugated tubes comprising the steps of surrounding a mandrel with a tube to be corrugated, confining a circumferential portion of the tube against radial and longitudinal movement in respect to the mandrel, radially confining a second circumferential portion of the tube which is longitudinally movable in respect to the mandrel and at a selected distance from the said first portion, moving said second portion longitudinally towards said first portion so as to form a corrugation between said portions, and repeating the operation of moving a circumferentially confined portion of the tube towards the previously formed corrugation.

3. The method of making circumferentially corrugated tubes comprising the steps of surrounding a mandrel with a tube to be corrugated, confining a circumferential portion of the tube against radial and longitudinal movement in respect to the mandrel, circumferentially clamping a portion of the tube which is longitudinally movable in respect to the mandrel and at a selected distance from the said portion being confined, moving said clamped portion towards said confined portion so as to form a corrugation between said confined and clamped portions, forming successive corrugations by holding said corrugation and releasing said clamped portion of the tube, reclamping the tube a selected distance from said last formed corrugation, releasing the corrugation, and moving the clamped portion of the tube toward the last formed corrugation.

4. The method of making circumferentially corrugated rubber composition tubes comprising the steps of surrounding a mandrel with a tube of incompletely vulcanized rubber composition to be corrugated, successively circumferentially confining the tube at spaced intervals, against outward radial expansion, and leaving a portion of the tube between said confined portions free to expand outwardly, and successively moving said confined portions longitudinally on the mandrel so as to bring such portions closer together and to form a corrugation in the tube between the confined portions, holding the corrugations thus formed against spreading, and vulcanizing the rubber composition tube in such position to cause it to retain such corrugated form.

5. The method of making circumferentially corrugated rubber composition tubes comprising the steps of surrounding a mandrel with a tube of incompletely vulcanized rubber composition, circumferentially confining the tube at spaced intervals against outward radial expansion and leaving the portion of the tube between said confined portions free to expand outwardly, moving at least one of said confined portions longitudinally on the mandrel so as to bring such portions closer together and form a corrugation in the tube between the confined portions, holding said corrugation in the position thus formed and successively forming other corrugations by circumferentially confining the tube at a selected distance from the preceding corrugation, and successively moving the circumferentially confined portions towards the preceding corrugation until the outer walls of the adjacent corrugations are brought in contact, holding the corrugations in contact with each other, and vulcanizing the rubber composition tube to cause it to retain its corrugated form.

WATSON G. HARDING.